United States Patent [19]

Dahan et al.

[11] Patent Number: 4,707,086
[45] Date of Patent: Nov. 17, 1987

[54] STAGE ASSEMBLY FOR THERMODYNAMIC STUDY UNDER A MICROSCOPE

[75] Inventors: Noël Dahan, Aulnay Sous Bois; Nicole Guilhaumou, Paris; René W. Couty, Le Perreux, all of France

[73] Assignee: Centre National de la Recherche Scientifique, France

[21] Appl. No.: 829,438

[22] Filed: Feb. 13, 1986

[30] Foreign Application Priority Data

Feb. 21, 1985 [FR] France ................................ 85 02512

[51] Int. Cl.$^4$ ...................... G01N 21/01; G02N 21/34
[52] U.S. Cl. ..................................... 350/536; 356/244
[58] Field of Search ......................... 350/533, 534–536; 73/863.11, 864.91; 165/60, 61; 356/244

[56] References Cited

U.S. PATENT DOCUMENTS 3,472,726 10/1969 Scheidegger ....................... 350/533
3,560,091 2/1971 Valkenburg et al. ............... 356/244
3,969,013 7/1976 Poty et al. ............................. 350/528

OTHER PUBLICATIONS

"A Chamber for Optical Studies at Pressures up to 50 Kbar and Temperatures from 80 to 300 K," by M. F. Shchanov et al., Cryogenics, Dec. 1974, vol. 14, No. 12, pp. 659–660.
"Small Flow-Through Cryostat for Polarization Microscope", by V. I. Silaev, et al., Instrum. and Exp. Tech., (U.S.A.), vol. 20, No. 4, pp. 1206–1208, ((Jul.-Aug.) 1977), publ. Feb. 1978.

Primary Examiner—John K. Corbin
Assistant Examiner—Vincent J. Lemmo
Attorney, Agent, or Firm—Quarles & Brady

[57] ABSTRACT

The invention relates to a stage assembly for use on a microscope when studying transient phenomena in which pressure and temperature may vary over very large ranges. Such an instrument is applicable to geology, mineralogy, crystallography, and solid state physics, for example. In accordance with the invention the stage assembly comprises a sealed outer envelope (1) having optical windows (6, 7), a sealed inner enclosure (8) in which an experiment volume (9) is defined and likewise having two optical windows (15, 16), and means for fixing and/or monitoring the temperature and the pressure in said experimental volume.

17 Claims, 4 Drawing Figures

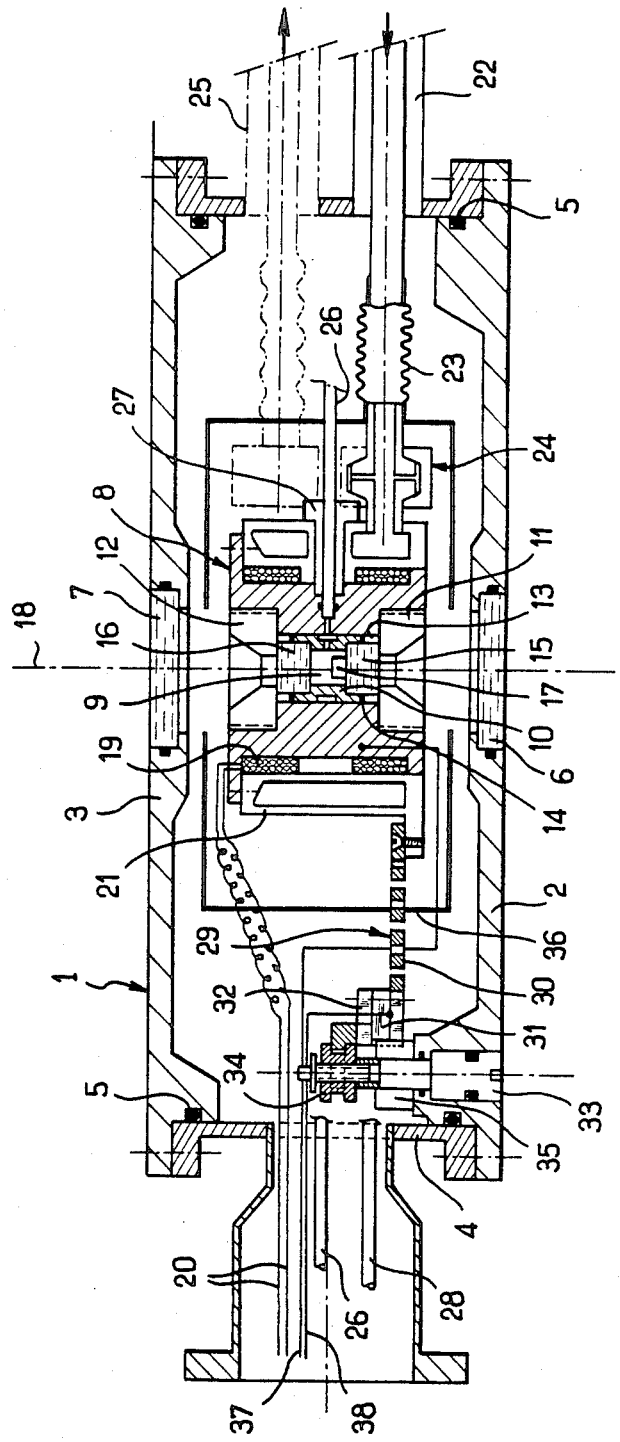

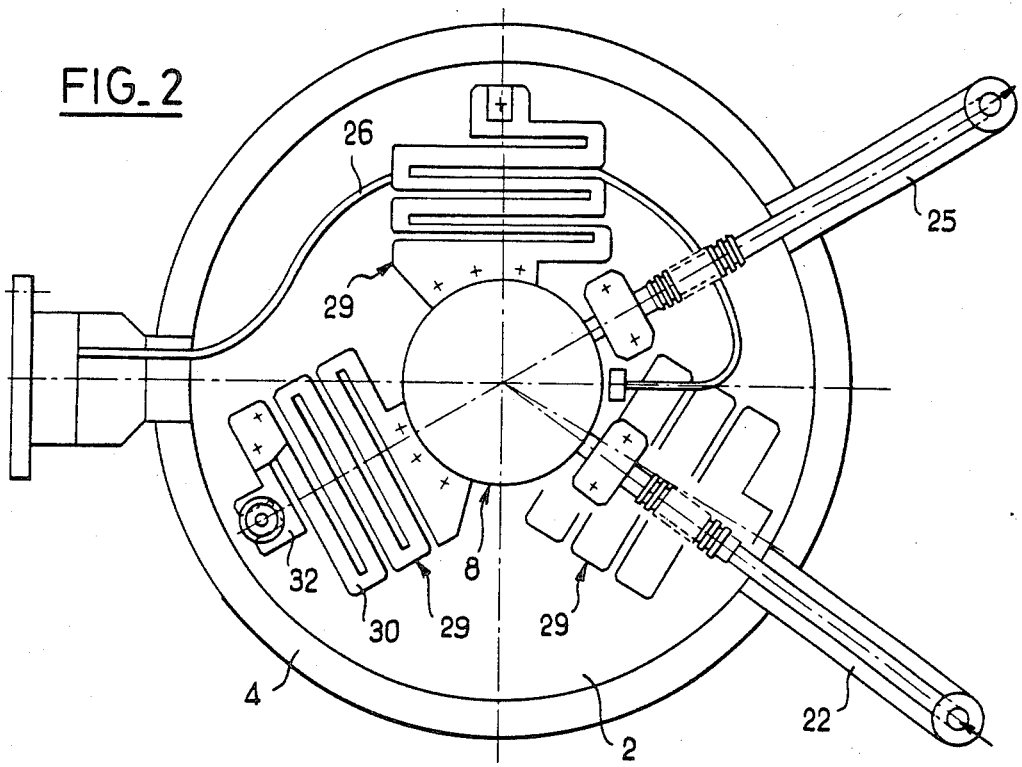
FIG_2
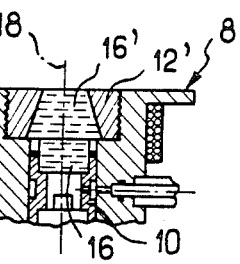
FIG_4
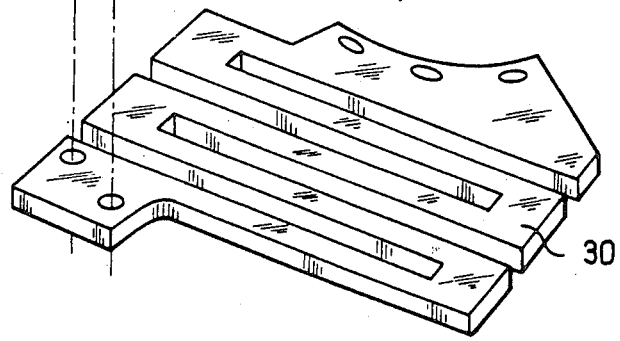
FIG_3

STAGE ASSEMBLY FOR THERMODYNAMIC STUDY UNDER A MICROSCOPE

The present invention relates to the study of transient phenomena under a microscope, and more particularly to a stage assembly for use in any experiments in which the thermodynamic parameters of temperature and pressure are physical parameters that may vary over very wide ranges. The term "stage assembly" used in the present application designates any type of apparatus placed on a microscope stage for observing various phenomena.

BACKGROUND OF THE INVENTION

Autoclaves and cryoautoclaves already exist in which an experimental volume is defined capable of being subjected to temperatures as high as 500° K. and to pressures as high as 3000 bars. However, these devices cannot be used for studying transient phenomena, since they are completely closed and microscope observation is impossible, so that observations are reduced merely to the ambient pressure and temperature conditions under which the sample for investigation is recovered. The German patent application published under the number 2 022 810 may be mentioned as an example.

A stage assembly has been proposed for observing transient phenomena, but for which temperature is the only physical parameter. This stage assembly comprises an oven having a copper tube suitable for passing liquid nitrogen wound thereabout, together with an optical condenser located in a ring. In addition to the above-mentioned limitation, this stage assembly operates solely at atmospheric pressure, so that its thermal insulation is inadequate at high temperatures. Nevertheless, this stage assembly is advantageous because of the accuracy of its measurements, since it uses ceramic-covered platinum probes for measuring temperature. A stage assembly of this type is shown in U.S. Pat. No. 3 969 013.

The stage assembly of the present invention seeks to cover wide ranges of variation in the physical parameters, in particular, it seeks to cover temperatures in the range 77° K. to 800° K. and pressures in the range 1 bar to 3000 bars.

Considerable difficulties appear when investigating the possibility of varying these two parameters over such wide ranges, because of the very small size of the experimental volume.

Thus, prior stage assemblies have been adapted, above all, to cope with large ranges of temperature variation only.

U.S. Pat. No. 3 472 726 describes a stage assembly through which light may be passed, and including an open disposed in an enclosure having an opening to the outside, said opening is necessary for air cooling, and the air is mixed by means of a fan.

British Pat. No. 1 375 193 describes another type of specimen stage which does not allow light to pass therethrough and which includes means for rapidly setting up desired temperature values. It mentions as a subsidiary point that the gaseous atmosphere in the experimental volume may be modified, but for the sole purpose of varying the type of gas for temperature measurements. This has nothing to do with considering pressure as one of the physical parameters which may be varied over a very wide range, and in addition, the structure of its rotating cover is quite unsuitable for large pressure variations.

Finally, existing devices do not allow obervations to be made under a microscope with the parameter conditions associated with the above-mentioned wide ranges. Nevertheless, such observations would be very useful in many disciplines, for example solid state physics, geology, biology, organic and inorganic chemistry, thermodynamics, crystallography, mineralogy, etc. . .

The main object of the invention is to provide a stage assembly which is sufficiently isolated from the optical equipment to enable phenomena to be observed over temperature and pressure ranges which may be as great as those mentioned above, without requiring fundamental alterations to the structure of the optical equipment.

Another object of the invention is to make it possible to use such a stage assembly with a conventional microscope, even though presently available sizes make it impossible to use a conventional microscope at maximum magnification.

Another object of the invention is to make it possible to operate in vacuo, thereby providing improved isolation during an experiment, and consequently providing greater stability in the ranges for thermodynamic study.

SUMMARY OF THE INVENTION

The present invention provides a stage assembly for thermodyanamic study under a microscope, the assembly being intended for use in experiments in which the parameters of temperature and pressure are physical parameters capable of varying over very wide ranges, said assembly comprising:

a sealed outer envelope having a bottom face and a top face, each of which is provided with an optical window;

an inner sealed enclosure lodged inside said outer envelope, and having a central hollow which is closed top and bottom by respective optical windows suitable for defining an experimental volume, said windows of said inner enclosure and of said outer envelope being parallel and aligned along an optical observation axis; and means for fixing and/or monitoring the values of the parameters of pressure and temperature extending inside said experimental volume, said means being accessible from the outside by means of a sealed passage through the side wall of said outer envelope.

For a reliable optical assembly over wide ranges of temperature and pressure, each optical window of the sealed enclosure is advantageously maintained between an associated threaded bush and a sleeve whose central bore constitutes the side wall of the experimental volume, said bushes having respective central holes aligned on the optical observation axis, said sleeve receiving at least a portion of each optical window in a corresponding end bore of greater diameter than its central bore; and further sealing means being provided in association with each of the optical windows.

For high temperatures, the sealed enclosure is provided with windings on its outer side wall constituting a heater resistance whose ends are accessible from the outside via a sealed passage through the side wall of the outer envelope, while for low temperatures, the sealed enclosure is lodged inside a surrounding tank capable of receiving a cooling fluid such as liquid nitrogen, with an inlet and an outlet for said fluid passing through the side wall of the outer envelope in sealed manner.

The other thermodynamic parameter, namely the pressure occupying the experimental volume is obtained by using at least one capillary tube, with one end entering into the sealed enclosure and with the other end passing in sealed manner through the side wall of the outer envelope.

To improve reliability, the sealed enclosure is connected to the outer envelope by semi-rigid connections. In particular, the inlet and outlet for said cooling fluid include corresponding semi-rigid connections, e.g. bellows type sleeves between the sealed enclosure and the outer envelope. Further, semi-rigid mechanical connections are provided radially between the sealed enclosure and one face of the outer envelope, advantageously including zig zag baffle elements in order to provide a long heat conduction path in reduced volume, each connection being associated with a threaded member to enable the parallelism of the sealed enclosure relative to the outer envelope to be adjusted from the outside.

An anti-radiation screen may be provided surrounding the sealed enclosure and inside the outer envelope.

In order to perform experiments in vacuo, a vacuum connection is provided through the side wall of the outer envelope, thereby making it possible to improve the thermal insulation of the sealed enclosure.

In order to accurately monitor the temperature surrounding the enclosure, thermocouples are provided for monitoring and/or regulating the temperature inside the outer envelope, together with a sealed passage through the side wall of said envelope.

BRIEF DESCRIPTION OF THE DRAWINGS

A preferred embodiment of the invention is described, by way of example, with reference to accompanying drawings, in which:

FIG. 1 is a section through a stage assembly in accordance with the invention and intended for placing on a microscope stage;

FIG. 2 is a plan view of the FIG. 1 stage seen from above, with the top face of the envelope and the anti-radiation screen having been removed in order to better distinguish the structure of the semi-rigid connection means between the sealed enclosure and its outer envelope;

FIG. 3 is a perspective view on a larger scale showing three components of a semi-rigid radial connection, with one of the components constituting a zig-zag baffle; and FIG. 4 is a section through a detail showing a variant optical window for the sealed enclosure of FIG. 1.

DESCRIPTION OF PREFERRED EMBODIMENT

The stage assembly shown in FIG. 1 comprises a sealed outer envelope 1 for placing on a microscope stage (not shown) in order to observe transient phenomena of various types in a manner explained below. The envelope 1 has a bottom face 2 and top face 3 which are parallel to each other and a side wall 4 which is cylindrical in this case and which includes sealed passages in order to pass various equipments as described below. All together the outer envelope constitutes a sealed box (sealing rings 5) which may be taken apart and which may be made of 18-10 stainless steel, for example.

The faces 2 and 3 are provided with respective optical windows 6 and 7 which are advantageously made of hard sapphire (alpha alumina), and inserted in associated housings in sealed manner (using unreferenced metal sealing rings).

A sealed enclosure 8 is located inside said envelope, and an experimental volume 9 is defined therein. The enclosure may be taken apart and it comprises a central bore having a sleeve 10 disposed therein, which sleeve is held in position by two threaded bushes 11, 12 with a ring 13 and a sealing ring 14 (made of metal or polytetrafluoroethylene) interposed therebetween. The bushes 11 and 12 hold respective optical windows 15 and 16 which are inserted in corresponding end bores in the sleeve 10. The bushes have central holes (not shown) allowing a sample under study 17 to be observed, said sample being disposed in the experimental volume 9 as delimited by the inside surface of the sleeve 10 and by one face each of the optical windows 15 and 16.

The optical windows 6, 7, 15, and 16 are mutually parallel and aligned on an optical observation axis indicated by a dot-dashed line 18.

The metal parts of the enclosure (the main block, the central sleeve, the rings, the sealing rings, and the threaded bushes) may be made of refractory steel (type XN26TW) or of titanium alloy. The optical windows 15 and 16 are made of hard sapphire (alpha alumina) like the windows 6 and 7.

If it is desired to perform experiments at pressures exceeding 1000 bars, and in practice up to 3000 bars, the sealing of the experimental volume may be improved around the optical windows 15 and 16, for example by forcing in the sapphires with an inert ring disposed around each of them (made of gold for example) with the slight deformation of said rings caused by said forcing in subsequently providing sealing under the sole effect of the pressure.

As for the other physical parameter, the possible temperature range is about 77° K to 800° K. Polytetrafluoroethylene provides good sealing around the windows 15 and 16 up to about 500° K, and above that temperature a metal sealing ring is preferable (for example using an annealed alloy including 95.5% aluminum).

The enclosure 8 thus constitutes a genuine sealed cryo-autoclave having two oppositely-directed optical passages. Using a cylindrical enclosure which is 33 mm high, an experimental volume may thus be obtained of about 0.17 cm$^3$.

The description now concerns means for varying the physical parameters over the above-specified ranges.

The temperature is varied either by heating using a resistance or by cooling using liquid nitrogen.

To this end, the sealed enclosure 9 is provided with winding 19 (a two-stage winding in the present example, with the stages being symmetrically disposed about a horizontal mid plane), constituting a heater resistance whose ends 20 are accessible from outside via a sealed passage through the side wall 4. Advantageously, a coaxial heater wire is used having an outside diameter of 1 mm and having a resistance of 34 ohms to 40 ohms at ambient temperature.

For cooling purposes, the enclosure 8 housed in a surrounding tank 21, with the tank and the enclosure being fixed to each other. An inlet duct 22 passes in sealed manner through the side wall 4 to feed the bottom of the tank 21 with liquid nitrogen via a bellows 23 and a conventional set of flanged rings 24. The outlet duct 25 provides an identical connection with the top of the tank 21, this connection is outlined using a dot-dashed line since it is angularly offset relative to the inlet duct 22 (see FIG. 2). The tank 21 may be made of 18-10 stainless steel and is entirely suitable for use with liquid nitrogen (with the low inlet ensuring proper circulation), and liquid nitrogen is a suitable fluid for providing the above-specified temperature range. If it is necessary to go to very much colder temperatures, for example to about 4° K., liquid helium would have to be used and this would considerably complicate the structure.

At least one high pressure capillary tube 26 is used for the pressure parameter. One end of the tube enters the enclosure 8 and the opposite end passes through the side wall 4 in sealed manner. It should be observed, that for the purpose of clarity, FIG. 1 shows the end of the tube entering the enclosure in the wrong angular position (see FIG. 2 for the correct position).

The single tube 26 shown in the drawings is connected by means of a ring 27 passing through the tank 21, and corresponding orifices pass through the block of the enclosure 8 and the sleeve 10 in order to provide communication with the experimental volume 9. A conventional capillary tube having an inside diameter of 0.3 mm and an outside diameter of 1.6 mm may be used.

It is important to observe that two similar capillary tubes could be used, for example when the system needs to be flushed, as is the case when studying mixtures (with two passages enabling a neutral gas to be injected and pumped through to wash out the experimental volume). Further, in order to further improve the temperature isolation of the sealed enclosure 8, a vacuum connection 28 passes in sealed manner through the side wall 4. Thus, the outer envelope 1 serves as an isolating (primary or secondary) vacuum chamber, while still providing a sealed connection between the inside and the outside for the various temperature and pressure equipments.

The sealed enclosure 8 thus offers a wide range of experimental possibilities, and the looked-for performance must not be spoiled by allowing the mechanical connections of the support to provide excessive thermal conduction or to be excessively vulnerable to stresses due to changes in size as the temperatures change.

Thus, in accordance with the invention, the sealed enclosure 8 is connected to the outer envelope 1 by semi-rigid connections.

Radial connections 29 are provided to this end and their structure will be better understood by referring to FIGS. 2 and 3. Each of said connections (there are three in this case) comprises a zig-zag baffle element which is fixed at one end to the tank 11, for example, a thermally insulating block 31, and a fixing bar 32 having an end fork with two parallel tines. These three components are superposed and are fixed to one another by screws, for example.

The bottom face 2 of the envelope has projections through which fixing members 33 pass in sealed manner, which members have threaded shanks inside the envelope. These shanks receive threaded nuts 34 having respective outwardly-directed coaxial grooves centrally location for receiving the tines of a respective one of the forks. The nuts 34 can thus be moved by external action between two abutments (a bottom ring 35 with a washer thereon, and a top washer), with the total available stroke being about 2 mm.

These radial connections are highly advantageous in that they provide three functions simultaneously:

they provide a semi-rigid connection of relatively great conduction length in a small volume (for example the conduction length may be 220 mm for an occupied volume of 40 mm × 50 mm × 2 mm), thereby minimizing the effects of heat conduction between the sealed enclosure and the outer envelope (and in particular the bottom face thereof);

they provide the sealed enclosure with complete freedom in expansion and contraction without a fixed point and without the stresses normally related to changes in size due to changes in temperature; and they make it possible to adjust the parallelism between the optical windows 15 and 16 and the optical windows 6 and 7 from the outside by means of a screwdriver slot, thereby avoiding spurious images both when performing visual observations and when performing measurements, e.g., using a laser beam (the Raman method).

The components 30 and 32 of these radial connections made be made of stainless steel or of titanium alloy, the block 31 may be made of polytetrafluoroethylene, and the nut 34 may be made of a copper and beryllium alloy.

This relative independence between the sealed enclosure and the outer envelope is completed by semi-rigid connections to the liquid nitrogen inlet 22 and outlet 25, for example by means of bellows sleeves (e.g. the sleeve 23 in FIG. 1).

Other additional equipment may be essential for some experiments.

For example, an anti-radiation screen 36 may be provided further improving the thermal isolation of the sealed enclosure 8, particularly when operating at temperatures in the range 300° K. to 800° K. Such a screen may be made of a multi-layer stack of 0.1 mm thick elements of 18-10 stainless steel with alternating 0.1 mm wide spaces, and it may be fixed to the radial connections 29. Naturally such a screen must never get in the way of the field of view between the optical windows.

Various thermocouples are generally provided, and the example shown includes two thermocouples 37 and 38. The thermocouple 37 serves to monitor and regulate the temperature very close to the experimental volume, whereas the thermocouple 38 serves to monitor one of the radial connections. Suitable thermocouples include K type sheathed chromel-alumel thermocouples whose range of operating temperatures is wide enough (such thermocouples are capable of operating up to 1,500° K.). Unfortunately, in spite of being more accurate than the above-mentioned thermocouples, platinum probes in ceramic sheaths cannot be used because the metal environment produces an unwanted migration effect.

The stage assembly in accordance with the invention is somewhat bulkier than existing devices, thereby limiting the enlargements which are currently attainable with an objective lens front spacing of not less than about 28 mm (giving a magnification of about 200 with a macroscope having a single central objective lens fitted with an incorporated zoom, and a magnification of up to about 400 using a macroscope having a five-lens head). Nevertheless, in spite of these limitations, numerous most interesting possibilities of use remain.

If necessary, the above-mentioned drawback may be mitigated by designing the optical windows of the sealed enclosure slightly differently. Thus, in the variant shown in FIG. 4, each threaded bush 12' has a conical central hole receiving an additional supporting sapphire 16' which makes contact, on its own, with the end sapphire 16 of the experimental volume. A single sapphire of the shape shown could alternatively be used, but it would be more fragile. With this variant, it is possible to reduce the necessary minimum front spacing. Given that the refractive index of sapphire is 1.852, the resulting gain is about 5 mm, which means that a front spacing of about 23 mm can be used, thereby giving access to greater magnifications.

This stage assembly makes it possible to display a set of phenomena which have heretofore been "observed" using blind experiments in an autoclave, which experiments are difficult to interpret over wide ranges of temperature and pressure. For example, the stage assembly makes it possible to measure density under confinement pressure in intercrystalline cavities, which has heretofore been impossible with apparatuses operating at atmospheric pressure because of crackling phenomena. This is most interesting when studying the history of rocks which have risen to the surface of the earth. The stage assembly is also of great assistance in microspectrometric analysis techniques in the near infrared (up to about 5 ¾ because of the sapphire windows) or with the Raman method (a non-destructive analysis using a laser beam to set up internal vibration), thereby enabling the exact composition of various observed phases to be determined, and allowing the evolution of the phases to be monitored as a function of the parameters of temperature and pressure.

More generally, the stage assembly of the present invention is very widely applicable. The following fields are merely examples:

geology: studying included fluids (microthermometry under confinement pressure, measurements of deformation and of secondary fracturing, etc.) or experimental studies (establishing phase diagrams for mixtures of gases and liquids, for dissolution, for recrystallization, etc . . . );

mineralology and crystallography: studying crystal growth, hydrothermal synthesis, etc . . . ;

solid state physics: studying deformations and viscosity; and chemistry and biology: studying reactions under pressure, kinetic studies of molecules.

Finally, applications in the oil and plastics industries should be mentioned.

The invention is not limited to the embodiment described and shown above, but covers any variant using equivalent means and falling within the scope of the accompanying claims.

We claim:

1. A stage assembly for thermodynamic study under a microscope, the assembly being intended for use in experiments in which the parameters of temperature and pressure and physical parameters capable of varying over very wide range, said assembly comprising:
a sealed outer envelope having a bottom face and a top face, each of which is provided with an optical window;
an inner sealed enclosure lodged inside said outer envelope and connected to said outer envelope by semi-rigid mechanical connecions, said sealed enclosure having a central hollow which is closed at its top and bottom by respective optical windows suitable for deining an experimental volume, said windows of said inner enclosue and of said outer envelope being parallel and aligned along an optical observation axis; and
means for fixing and/or monitoring the variable value of the parameter of pressure extending inside said experimental volume, said means comprising at least one capillary tube having one end entering into the sealed enclosure and having its other end passing in sealed manner through the side wall of the outer envelope; and
means for fixing and/or monitoring the variable values of the parameter of temperature extending inside said experimental volume, said means being accesible from the outside by means of a sealed passage through the side wall of said outer envelope.

2. A stage assembly according to claim 1, wherein each optical window of the sealed enclosure is held between an associated threaded bush and a sleeve whose central bore constitutes the side wall of the experimental volume, said bushes having respective central holes aligned on the optical observation axis.

3. A stage assembly according to claim 2, wherein each optical window is held by a conical portion thereof received in an associated central housing of the associated threaded bush, said window being either in a single piece or in two pieces.

4. A stage assembly according to claim 2, wherein the sleeve receives at least a portion of each optical window in a corresponding end bore of greater diameter than the central bore thereof.

5. A stage assembly according to claim 2, wherein sealing means are provided around each of the optical windows.

6. A stage assembly according to claim 1, wherein the sealed enclosure is provided with windings on its outside wall, said windings constituting a heater resistance whose ends are accessible from the outside via a sealed passage through the side wall of the outer envelope.

7. A stage assembly according to claim 1, wherein the sealed enclosure is housed in a surrounding tank capable of receiving a cooling fluid such as liquid nitrogen, an inlet and outlet for said fluid being provided passing through the side wall of the outer envelope in sealed manner.

8. A stage assembly according to claim 7, wherein the fluid ilet and the fluid outlet also include respective semi-rigid connections, for example a bellows sleeve between the sealed enclosure and the outer envelope.

9. A stage assembly according to claim 1, wherein the semi-rigid mechanical connections extend radially between the sealed enclosure and one face of the outer envelope.

10. A stage assembly according to claim 9, wherein the radial mechanical connections include respective zig-zag baffles providing a long conduction path in a small volume.

11. A stage assembly according to claim 9 or 10, wherein the radial mechanical connections are fixed to associated threaded members in such a manner as to enable the parallelism of the sealed enclosure relative to the outer envelope to be adjusted from the outside.

12. A stage assembly according to claim 1, further including an anti-radiation screen surrounding the sealed enclosure inside the outer envelope.

13. A stage assembly according to claim 1, including a vacuum connection through the side wall of the outer envelope to enable the thermal isolation of the sealed enclosure to be improved.

14. A stage assembly according to claim 1, wherein thermocouples are provided for monitoring and/or regulating the temperature inside the sealed enclosure, said thermocouples passing sealed manner through the side wall of said outer envelope.

15. A stage assembly for thermodynamic study under a microscope, the assembly being intended for use in experiments in which the parameters of temperature and pressure are physical parameters capable of varying over very wide ranges, said assembly compising:

a sealed outer envelope having a bottom face and a top face, each of which is provided with an optical window;

an inner enclosure lodged inside said outer envelope, and having a central hollow which is closed at its top and bottom by respective optical windows suitable for defining an experimental volume, said windows of said inner enclosure and of said outer envelope being parallel and aligned along an optical observation axis;

means for sealing the walls of said experimental volume so that it will retin a range of pressure values extending from a value below atmospheric pressure to a value higher than atmospheric pressure; and means for fixing and/or monitoring the values of the parmeters of pressure and temperature extending inside said expeimental volume, said means being accesible from the outside by means of a sealed passage through the side wall of said outer envelope.

16. A stage assembly accourding to claim 15, wherein the pressure in the experimental volume is obtained by using at least one capillary tubve having one end entering into the sealed enclosue and having its other end passing insealed manner through the side wall of the outer envelope.

17. A stage assembly according to claim 15, wherein the sealed enclosure is connected to the outer envelope by simi-rigid connections

* * * * *